United States Patent [19]

Behr et al.

[11] 4,423,933
[45] Jan. 3, 1984

[54] READER FOR MICROFICHES WITH A DISPLAY FOR IMAGE-FIELD COORDINATES

[75] Inventors: Karl-Günther Behr, Biebertal; Werner Junker, Lollar, both of Fed. Rep. of Germany

[73] Assignee: Minox G.m.b.H., Giessen, Fed. Rep. of Germany

[21] Appl. No.: 361,201

[22] Filed: Mar. 24, 1982

[30] Foreign Application Priority Data

Mar. 30, 1981 [DE] Fed. Rep. of Germany ....... 3112610

[51] Int. Cl.³ .............................................. G03B 23/08
[52] U.S. Cl. .................................................. 353/27 R
[58] Field of Search ................... 353/27 R, 36, 40, 42; 340/825, 825.82, 686; 40/458, 463

[56] References Cited

U.S. PATENT DOCUMENTS

| | | | |
|---|---|---|---|
| 2,735,334 | 2/1956 | Emery et al. | 353/26 R |
| 3,296,521 | 1/1967 | Wildberger | 340/686 X |
| 3,319,518 | 5/1967 | Carlson | 353/27 R X |
| 3,786,417 | 1/1974 | Carlson | 340/825 |
| 3,797,925 | 3/1974 | Smitzer | 353/27 R |
| 3,799,663 | 3/1974 | Barre et al. | 353/27 R |
| 3,807,846 | 4/1974 | Swank | 353/40 X |
| 4,311,370 | 1/1982 | Poehler | 353/27 R |

FOREIGN PATENT DOCUMENTS 2839397  3/1980  Fed. Rep. of Germany .... 353/27 R

Primary Examiner—Harry N. Haroian
Attorney, Agent, or Firm—Wells & Wells

[57] ABSTRACT

A microfilm reader having a film stage which is displaceable in two coordinate directions for moving a microfiche supported thereon through an optical path defined by a projection lamp and an optical system which projects an image of the microimages arranged in rows and columns on the microfiche onto a ground glass screen via a plurality of reflecting mirrors. The microfilm reader comprises in combination on the ground glass screen or on the housing adjacent to the ground glass screen a first scale corresponding to the microimage rows and a second scale corresponding to the microimage columns, a movable first marking in combination with the first scale and a second marking in combination with the second scale, these markings being coupled with the displacement means of the film stage to indicate the row and the column of the microimage presently projected onto the ground glass screen.

12 Claims, 3 Drawing Figures

READER FOR MICROFICHES WITH A DISPLAY FOR IMAGE-FIELD COORDINATES

BACKGROUND OF THE INVENTION

The invention relates to a reader for microfilm, especially for microfinches.

It is known to arrange the information in several individual image fields of microfiches and to array these image fields in horizontal rows and vertical columns.

The microfiches are placed into the reader film stage which can be displaced into two mutually orthogonal coordinate directions and the desired image field is moved into the projection beam by appropriately displacing the film stage. Once this is done. A projection of the desired image appears on the ground-glass screen of the reader.

In order to facilitate the positioning of the particular image field into the beam, it is known to mount markings on the setting means of the displaceable film stage and/or on the reader housing whereby the film stage can be adjusted in controlled manner in the coordinates of the desired image field.

As already indicated, the previously known markings however are all directly next to or close-by the means displacing the film stage. When setting the film stage, the user therefore is required to first look at the displacement means to make sure that he is adjusting the proper coordinates for the desired image field. Only thereupon can the user look at the ground-glass screen and ascertain that the desired image field in fact appears on it.

If this is not the case, for instance because he has made a mistake in the image-field coordinates, the film stage must be moved and set again, and this procedure possibly may have to be carried out several times until the right image field is found. The user is forced therefore to look several times to and fro with the displacing means and the ground-glass screen, which is cumbersome and disadvantageous on several accounts. On one hand this means a more than trivial cost in time by this repeated alternating looking, and on the other hand the user is forced to accommodate his eyesight in rapid sequence to the different distances to the ground-glass and to the displacing means.

SUMMARY OF THE INVENTION

It is therefore the object of the invention to overcome these drawbacks.

This problem is solved by the invention in that the image-field coordinates are displaced in the plane of the ground-glass screen. The display may take place either directly on the ground-glass screen itself, or it may also materialize outside the ground-glass screen but directly at its edge.

This display of the image-field coordinates, whether on the ground-glass screen or at its edge, can be implemented with respect to scales fixed on the ground-glass screen or the housing using mechanical markings or luminous ones. The mechanical markings also are mechanically coupled with the means displacing the film stage and the luminous markings are moved as a function of the relative displacement between the film stage and the scales.

In the invention, the luminous markings may be light dots transmitted by fiber optics, or a row of light-emitting diodes may be provided, of which always one LED will light up opposite that scale marking which corresponds to the particular instantaneous film-stage position.

In the first solution two light sources are connected in conformity with the invention with the film-stage, one of which sources is displaced analoguously as a function of the motion of the film-stage in one of the coordinate directions, while the other light source is moved analoguously as a function of the displacement of the film-stage in the second coordinate direction. Furthermore an optic foil consisting of a number of adjacent optical fibers corresponding to the number of the rows or columns to be displayed is provided, one of the light sources being displaceable in front of one of the end faces of these optic fibers while the other end faces are opposite the markings on the scales on the ground-glass screen or the housing.

In the second solution the scales on the ground glass or the housing cooperate in each coordinate direction in such a manner with a row of light-emitting diodes that one LED is opposite each scale marking and the individual LED's are controlled as a function of the film-stage position and light up for it.

In particular however a concrete solution is proposed, which is characterized by the following features:

All the LED's of one coordinate direction are arranged in a common circuit. The LED's have different potential ranges (threshold values) within which they light up; and the common circuit contains a first variable resistance which can be set as a function of the film-stage position, so that depending on the position of the film-stage, different potentials are applied to the common circuit and accordingly always another LED characteristic of the film-stage position will light up.

However, because neither the number of columns nor that of the rows is standardized on microfiches, and instead microfiches with quite different numbers of rows and columns are used, it is proposed further to provide means in each of the two common circuits whereby each circuit can be adjusted for a given number of rows or columns. These means consist each of a second externally set variable resistance in series in each of the two circuits with the first variable resistance and ensure that the supply potential is set at a maximum value corresponding to the maximum number of rows or columns.

If thus the reader display has been set at a maximum number of columns for instance of 28 columns and 15 rows (or any other maximum number deemed to the point by the designer), then the LED's will light up from the first to the last in sequence only when the full supply potential is applied across the first variable resistance. If on the other hand a microfiche for instance with only 20 columns is placed into the reader, then the second variable resistance can be used to lower the supply potential to such a degree that the 20th diode shall be the last LED which lights up. The 21st to 28th diodes so-to-speak will be cut off.

The same features also apply to the second variable resistance in the LED-row circuit as regards the display of the row, the two variable resistances being calibrated if needed according to rows or columns. More details will be provided herebelow in the specific description.

BRIEF DESCRIPTION OF THE DRAWINGS

The drawing shows the invention in relation to several illustrative embodiments.

FIG. 1 shows the housing 1 of a microfilm reader which is provided with a film-stage 2 displaceable along the x- and y-directions. A microfiche can be placed on the film stage and its individual images are projected on a ground-glass screen 3.

Figure 1:
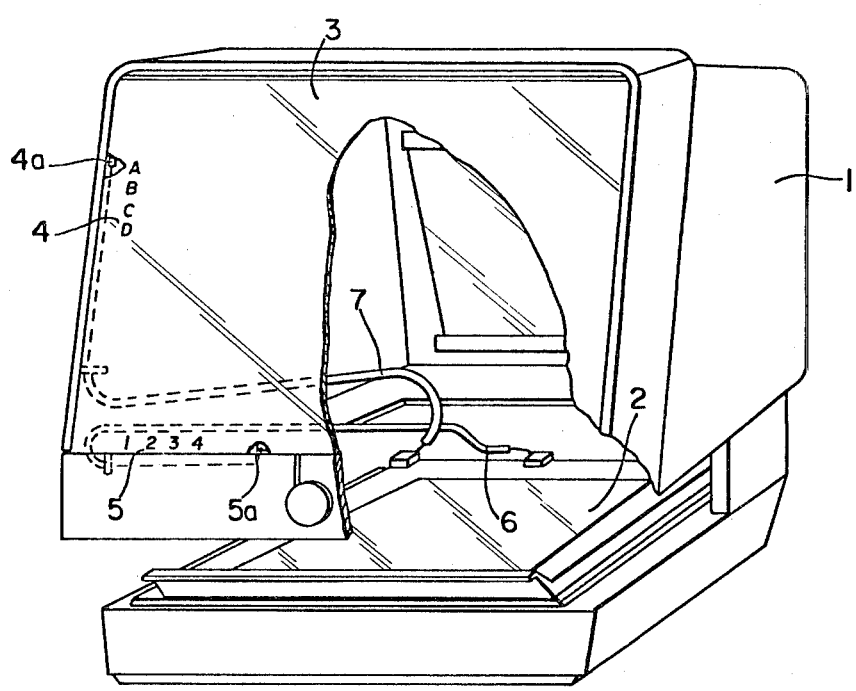
FIG. 1 is a schematic reader with a mechanical display of the film-stage position in the plane of the ground-glass screen.

Scales 4 and 5 are arranged on the ground-glass screen 3 and correspond resp. to the rows and columns contained in the microfiche.

Display markings 4a and 5a displaceable along the scales 4 and 5 resp. so cooperate with these scales that the latter display marking always indicates the row and the column of that individual image of the microfiche which happens to be in the projection beam. The markings therefore always show the coordinates of the particular image being projected.

The markings 4a and 5a are mechanically joined to the film stage 2 and are displaced as a function of the motion of the film stage. This mechanical linkage consists of the bowden cables 6 (to marking 4a) and 7 (to marking 5a). The two bowden cables are solidly connected to the film stage 2 in such a manner that the bowden cable 6 displaces the marking 4a when the film stage moves in the y-direction while the bowden cable 7 moves the marking 5a when the film stage is displaced in the x-directon. The display of the film-stage position therefore is purely mechanical in this illustrative embodiment.

Figure 2:
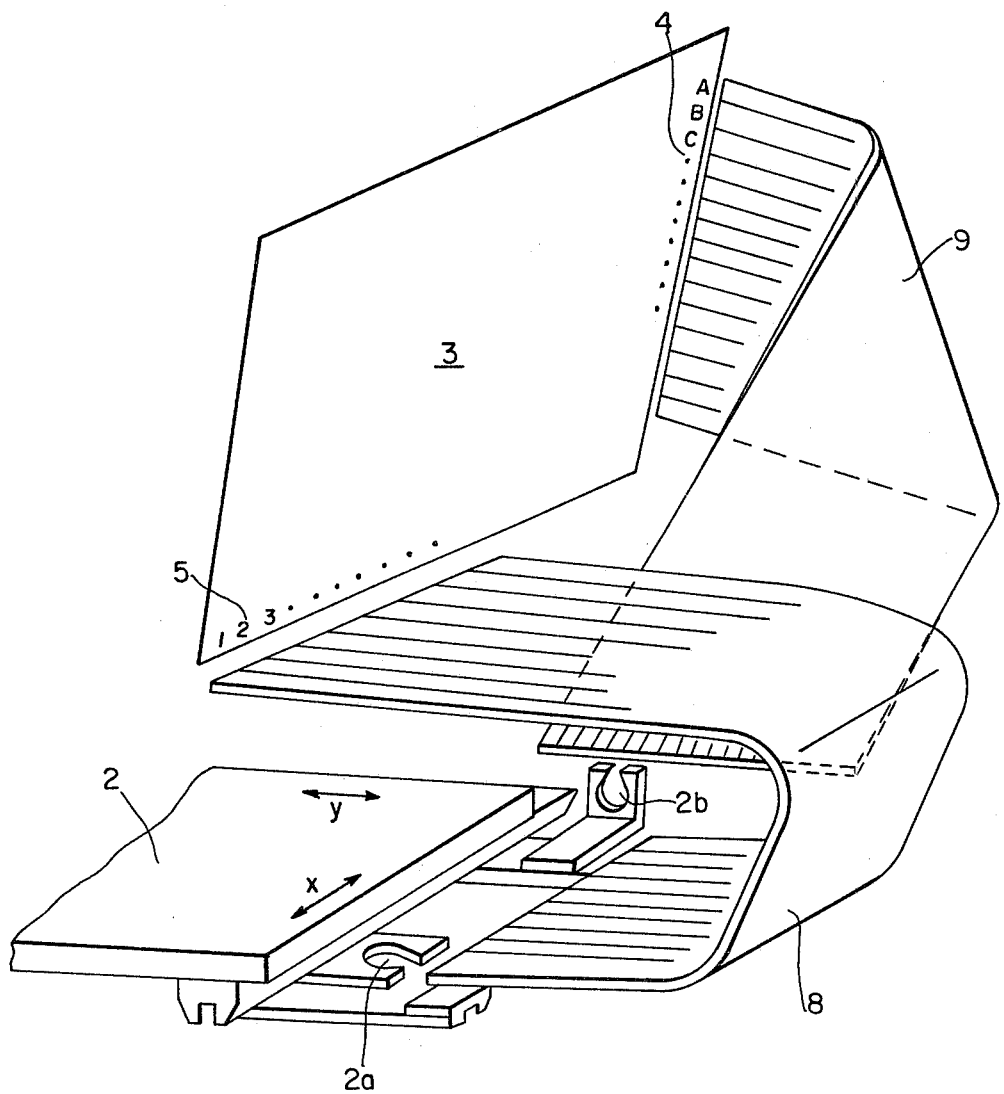
FIG. 2 is a schematic of the film-stage and the ground-glass screen of a reader where the film-stage position is displayed by luminous dots transmitted by optic fibers.

As regards the embodiment shown in FIG. 2, the film-stage position is displayed by individual light dots cooperating with the scales. The figure again shows the ground-glass screen 3 onto which are mounted the scales 4 and 5. Furthermore the rear part of the film stage 2 is shown in schematic perspective and is displaceable again in the x- and y-directions.

Two light sources 2a,2b are solidly joined to the film stage 2 and each may be preceded by a slit stop. Each of the light sources operates in concert with an optical foil 8 and 9 resp. Each of these optical foils contains as many optical fibers as there are individual positions in the scale assigned to it. Each end of an optical figer is opposite one marking in the scale.

The other ends of the optical foils 8,9 are opposite the light sources 2a,2b which move parallel to the end of the optical foil when the film stage is displaced in the x- or the y-direction. It will be easily noted that the light from the light sources is always incident on other individual optical fibers and passes through these to the ground-glass screen, whereby in each case precisely that scale marking will light up which corresponds to the particular position of the film-stage 2.

In a simple manner, which therefore is not discussed in more detail, care is taken that the spacing between the light sources and the ends of the optical foil will always remain constant when the film-stage 2 is being moved.

Figure 3:
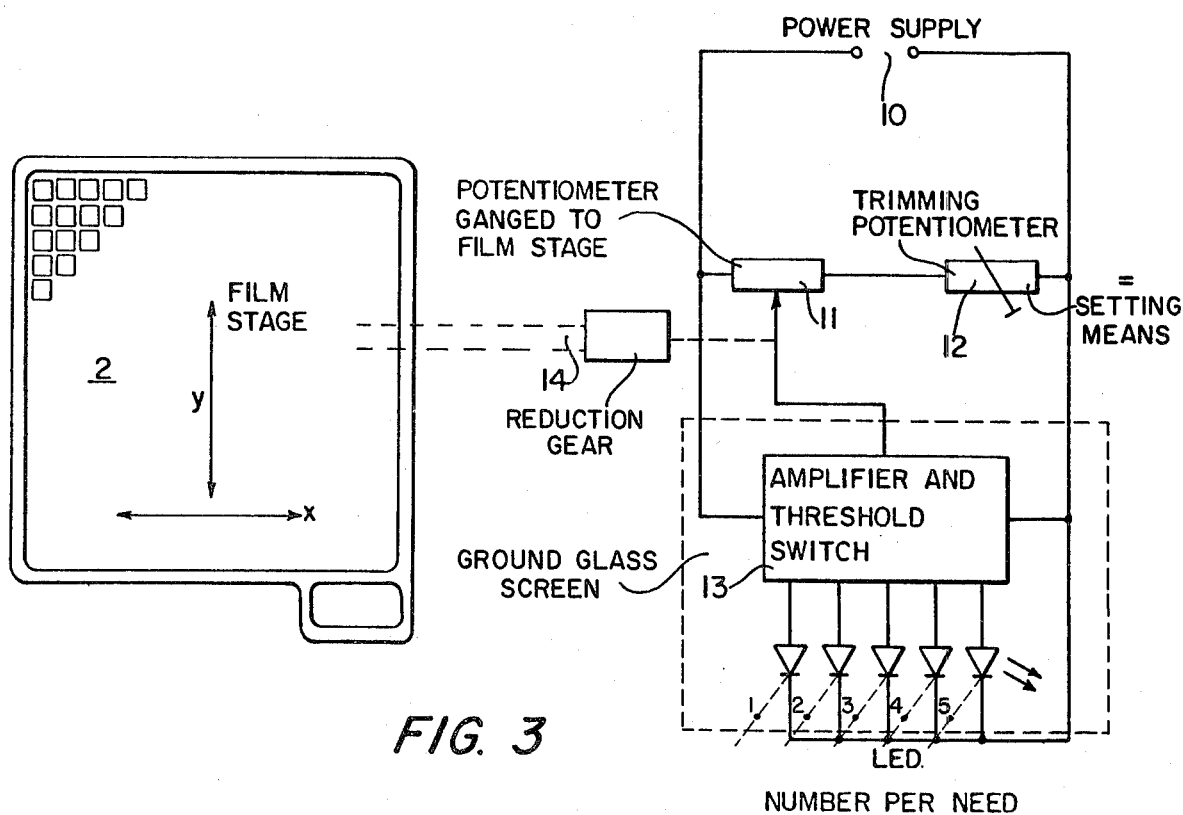
FIG. 3 schematically shows an LED-row for the display of the film-stage position.

As regards the embodiment of FIG. 3, the position of the film-stage also is displayed by light dots functioning in concert with the scales. However these luminous dots are transmitted not optically, but electrically.

For that purpose one light-emitting diode (LED) is located behind each scale marking and lights up when the film-stage assumes precisely this coordinate position. Accordingly an entire row of LED's is arranged behind the scale for the image rows and behind the scale for the image columns, of which only one LED will light up, both together indicating the coordinates of the particular film-stage position.

FIG. 3 only shows the LED row for the scale of one coordinate direction. But it is obvious that the arrangement and the circuit for the second coordinate direction is the same.

The arrangement of the row of LED's essentially consists of a current source 10 and of a circuit containing a potentiometer 11 and a trimming potentiometer 12 in series.

A potential for the threshold switch 13 is tapped off the potentiometer 11; this switch 13 controls the LED's. This potentiometer tap is ganged by a means 14 to the film stage 2.

In this manner a specific potential characteristic of the film-stage position is always tapped at the potentiometer 11, whereby the LED specifically corresponding to this position will light up behind the scale by means of the threshold switch 13 and thus indicates the film-stage position. Within a given range of potential, the threshold switch furthermore will only control one LED, while all other LED's remain dark. If then the film-stage 2 is made to move through the entire path of setting in the x- or y-direction, all the LED's will light up consecutively.

The number of markings present on a scale and hence the number of LED's arranged in relation to a scale can vary because the number of rows and columns is not standard on the microfiche. However each scale and each row of LED's must comprise as many markings and LED's as the typical maximum number of rows and columns found on a microfiche. Be it noted in merely illustrative manner that this might be for instance 28 columns and 15 rows; accordingly 28 LED's must be provided for the column display and 15 LED's for the row display, and obviously the positions 1–28 must be marked on the column scale and the positions A–O on the row scale.

If now a microfiche is emplaced that has a lesser number of columns and rows, then the higher-numbered LED's will not be needed. Appropriately these shall be pre-excluded from lighting up. This is implemented by using the trimming potentiometer 12. By means of this potentiometer it is possible to so reduce from the start the potential applied to the circuit that even when the potentiometer 11 is in that end position where the maximum potential is tapped, only such a potential is applied to the threshold switch which permits that LED to light up which corresponds to the highest number of columns or rows of the just inserted microfiche, for instance the 15th LED when the microfiche only comprises 15 columns.

The entire path of setting of the film-stage, which is always the same regardless of the number of columns or rows of the microfiche, thereby will not be divided for instance in 28 LED's, but only for instance in 15 LED's. As a result, the gap between the lighting of one LED to the next is enlarged; this setting path therefore is practically stretched.

As the potential from the power source 10 and the response voltages of the individual LED's as well as other electrical data of the circuit are fully known, the trimming potentiometer 12 can be pre-calibrated into columns and rows. When inserting a microfiche, the user already can pre-set the number of columns and the number of rows at the two trimming potentiometers, whereby he then obtains the indication of the film-stage position on the ground-glass screen or at its edge, the higher-number LED's which are not required not being used.

We claim:

1. In a microfilm reader having a film stage having means for displacement in two coordinate directions for moving a microfiche supported thereon through an optical path defined by a projection lamp and an optical system which projects an image of the microimages arranged in rows and columns on the microfiche onto a ground glass screen having a housing via a plurality of reflecting mirrors, the improvement comprising a microfiche reader comprising in combination on said ground glass screen a first scale corresponding to said microimage rows and a second scale corresponding to said microimage columns, a movable first marking in combination with said first scale and a second marking in combination with said second scale, said markings being coupled with said displacement means of the film stage and indicating the row and the column of the microimage presently projected on said ground glass screen, said scales on said ground glass cooperating in each of two coordinate directions with a row of light-emitting diodes defining said first and second markings having one LED opposite each said scale marking and individual LED's controlled by the position of said film stage and light up.

2. The microfilm reader as defined in claim 1, wherein each said LED is located in a parallel circuit provided with a switch having a control member which is closed by said control member connected to said film stage for that particular film stage position which is assigned to this combination of LED and scale marking.

3. The microfilm reader as defined in claim 2, wherein
(a) all said LED's of one coordinate direction are arranged in parallel in a circuit;
(b) said individual LED's having given threshold values wherein they light up;
(c) a said circuit including a first variable resistance which is set as a function of the film-stage position so that different potentials are applied to the said circuit depending on the position of the film stage and accordingly another LED characteristic of the film stage position lights up.

4. The microfilm reader as defined in claim 3, wherein said first variable resistance is mechanically coupled by a reduction gear to said film stage.

5. The microfilm reader as defined in claim 3, wherein said circuit additionally includes a second, adjusted variable resistance external to said housing in series with said first variable resistance, said second variable resistance permitting presetting a potential for said circuit.

6. The microfilm reader as defined in claim 5, wherein said second variable resistance has setting means calibrated for rows or columns.

7. The microfilm reader as defined in claim 2, wherein
(a) all said LED's of one coordinate direction are arranged in parallel in a circuit;
(b) said individual LED's having given threshold values wherein they light up;
(c) a said circuit including a first variable resistance which is set as a function of the film-stage position so that different potentials are applied to said circuit depending on the position of the film stage and accordingly another LED characteristic of the film stage position lights up.

8. The microfilm reader as defined in claim 7, wherein said first variable resistance is mechanically coupled by a reduction gear to said film stage.

9. The microfilm reader as defined in claim 7, wherein said circuit additionally includes a second, adjusted variable resistance external to said housing in series with said first variable resistance, said second variable resistance permitting presetting a potential for said circuit.

10. The microfilm reader as defined in claim 9, wherein said second variable resistance (12) has setting means calibrated for rows or columns.

11. In a microfilm reader having a film stage having means for displacement in two coordinate directions for moving a microfiche supported thereon through an optical path defined by a projection lamp and an optical system which projects an image of the microimages arranged in rows and columns on the microfiche onto a ground glass screen having a housing via a plurality of reflecting mirrors, the improvement comprising a microfiche reader comprising in combination on said housing adjacent to the said ground glass screen a first scale corresponding to said microimage rows and a second scale corresponding to said microimage columns, a movable first marking in combination with said first scale and a second marking in combination with said second scale, said markings being coupled with said displacement means of the film stage and indicating the row and the column of the microimage presently projected on said ground glass screen, said scales on said housing cooperating in each of two coordinate directions with a row of light-emitting diodes defining said first and second markings having one LED opposite each said scale marking and individual LED's controlled by the position of said film stage and light up.

12. The microfilm reader as defined in claim 11, wherein each said LED is located in a parallel circuit provided with a switch having a control member which is closed by said control member connected to said film stage for that particular film stage position which is assigned to this combination of LED and scale marking.

* * * * *